(12) United States Patent
Kobayashi et al.

(10) Patent No.: US 8,610,837 B2
(45) Date of Patent: Dec. 17, 2013

(54) DISPLAY DEVICE AND MANUFACTURING METHOD THEREOF

(75) Inventors: Setsuo Kobayashi, Mobara (JP); Akira Ishii, Mobara (JP); Masanori Katsuyama, Iruma (JP); Shinji Tanabe, Mobara (JP); Kiyoshi Sento, Sakura (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 356 days.

(21) Appl. No.: 13/020,132

(22) Filed: Feb. 3, 2011

(65) Prior Publication Data

US 2011/0187960 A1 Aug. 4, 2011

(30) Foreign Application Priority Data

Feb. 4, 2010 (JP) .................. 2010-022709

(51) Int. Cl.
*G02F 1/1335* (2006.01)
*G02F 1/1333* (2006.01)
*G02F 1/1339* (2006.01)

(52) U.S. Cl.
USPC ............... 349/12; 349/58; 349/160; 349/153; 349/190

(58) Field of Classification Search
USPC ................... 349/12, 58, 160, 153, 190
See application file for complete search history.

(56) References Cited

U.S. PATENT DOCUMENTS

| | | | |
|---|---|---|---|
| 7,486,654 B2 | 2/2009 | Yoneta | |
| 8,378,983 B2* | 2/2013 | Nozawa et al. | 345/173 |
| 2010/0197187 A1 | 8/2010 | Naraba et al. | |
| 2012/0092817 A1* | 4/2012 | Shibahara et al. | 361/679.01 |

FOREIGN PATENT DOCUMENTS

| | | | |
|---|---|---|---|
| JP | 2007-201707 | | 8/2007 |
| JP | 2009-008851 | | 1/2009 |
| JP | 2009-109537 | | 5/2009 |
| JP | 2009109537 A | * | 5/2009 |

* cited by examiner

*Primary Examiner* — Mike Qi
(74) *Attorney, Agent, or Firm* — Antonelli, Terry, Stout & Kraus, LLP.

(57) ABSTRACT

Disclosed is a display device in which reliable bonding strength and high reparability are compatible when a panel-like member is bonded to a display panel.
The display device comprises: a display panel; and a panel-like member bonded to the display panel with an adhesive made of an ultraviolet curable resin; wherein the adhesive includes a first adhesive portion and a second adhesive portion, the first adhesive portion being provided outside of a display area of the display panel and formed in a circular shape to surround the display area, the second adhesive portion prevailing in an area surrounded by the first adhesive portion, the first adhesive portion being different in a modulus of elasticity from the second adhesive portion, and wherein the modulus of elasticity of the second adhesive portion is smaller than the modulus of elasticity of the first adhesive portion.

8 Claims, 14 Drawing Sheets

DISPLAY DEVICE AND MANUFACTURING METHOD THEREOF

CLAIM OF PRIORITY

The present application claims priority from Japanese Patent Application JP 2010-022709 filed on Feb. 4, 2010, the content of which is hereby incorporated by reference into this application.

BACKGROUND OF THE INVENTION

1. Field of the Invention

The present invention relates to a display device and a manufacturing method thereof. The invention particularly relates to a technique which is effective when applied to a liquid crystal display device in which a panel-like member such as a protective panel is bonded to a liquid crystal display panel.

2. Description of the Related Art

Liquid crystal display devices have been used so far, for example, as displays (display devices) for mobile electronic devices such as mobile phone terminals or digital cameras.

In recent years, size and weight of mobile electronic devices have been decreased more and more. Along with this, the thickness of liquid crystal display devices has also been decreased. The method for making the thickness of the liquid crystal display devices decrease includes reduction in the thickness of liquid crystal display panels, for example.

For the mobile electronic devices, while a protective cover was bonded so far to a casing accommodating a liquid crystal display device, a method of directly bonding the cover to a liquid crystal display panel has been proposed together with decrease in the thickness of the liquid crystal display panel (for example, refer to JP-A-2007-201707). According to the method, not only the thickness of the display portion of the mobile electronic device can be decreased further. Moreover, it is possible to prevent degradation of the visibility caused by an air layer present between the liquid crystal panel and the protective cover and regarded as a problem in the existent mobile electronic device.

Further, recent mobile electronic devices often have, for example, a touch panel mounted thereon. In the mobile electronic device having the touch panel mounted thereon, a touch panel is often bonded to the liquid crystal display panel to prevent degradation of visibility or operability caused by the air layer present between the liquid crystal display panel and the touch panel.

SUMMARY OF THE INVENTION

When a panel-like member such as a protective cover or a touch panel is bonded to a liquid crystal display panel, a pressure sensitive adhesive or an adhesive is used. As the pressure sensitive adhesive or adhesive, a resin material having high bonding strength (for example, acrylic resin) is used such that the panel-like member does not peel off during the assembling steps of a liquid crystal display device or a mobile electronic device or during the use of the portable electronic device.

When the panel-like member is bonded to the liquid crystal display panel by using the pressure sensitive adhesive or the adhesive made of a resin material, a thermosetting resin or an ultraviolet curable resin is used, for example, as the resin material. When the panel-like member is bonded to the liquid crystal display panel by using the thermosetting resin or the ultraviolet curable resin, an uncured resin material is coated on the surface of the panel-like member or the liquid crystal display panel. The panel-like member and the liquid crystal display panel are closely bonded by the uncured resin material and then the resin material is cured completely.

When the panel-like member is bonded to the liquid crystal display panel by using the thermosetting resin or the ultraviolet curable resin, foams may sometimes be formed, for example, inside of the resin material, or at the boundary between the panel-like member and the liquid crystal display panel. If such foams develop in the display area, the display quality is degraded by the foams. Accordingly, in a case where the foams are formed, for example, inside the resin material, repairing work is performed, for example, by peeling the panel-like member and bonding the same again to the liquid crystal display panel.

Further, when the panel-like member is bonded to the liquid crystal display panel, the surface of the panel-like member may be injured sometimes during the assembling steps of the liquid crystal display device or the portable electronic device or during the use of the portable electronic device. When the surface of the panel-like member is injured, repairing work of peeling the panel-like member and bonding another panel-like member to the liquid crystal display panel is performed.

However, in existent liquid crystal display devices, when the pressure sensitive adhesive or the adhesive is used upon bonding the panel-like member to the liquid crystal display panel, the bonding strengths thereof to the panel-like member and to the liquid crystal display panel are uniform within the adhesion surface respectively. Accordingly, when the panel-like member is peeled, it is necessary to apply a large force but this causes a problem, for example, that the panel-like member or the liquid crystal display panel is susceptible to breakage.

Further, to prevent breakage of the panel-like member or the liquid crystal display panel upon peeling the panel-like member, it may be better to decrease the bonding strength of the pressure sensitive adhesive or the adhesive. However, this causes another problem that the panel-like member tends to peel off, for example, during the use of the portable electronic device.

That is, the existent liquid crystal display device in which the panel member and the liquid crystal display panel are bonded to each other involves a problem that it is difficult to obtain compatibility between the reliable bonding strength and high repairability of the panel-like member.

The present invention intends to provide a technique capable of obtaining the compatibility between the reliable bonding strength and the high reparability of the panel-like member, for example, in a liquid crystal display device in which the panel-like member is bonded to a liquid crystal display panel.

These and other objects, as well as novel features of the present invention will become apparent from the description of the present specification and the appended drawings.

Outlines of typical inventions disclosed in the present application are to be described as shown below.

(1) According to a first aspect of the present invention, a display device comprising:

a display panel; and a panel-like member bonded to the display panel with an adhesive made of an ultraviolet curable resin;

wherein the adhesive includes a first adhesive portion and a second adhesive portion, the first adhesive portion being provided outside of a display area of the display panel and formed in a circular shape to surround the display area, the second adhesive portion prevailing in an area surrounded by the first adhesive portion, the first adhesive portion being different in a modulus of elasticity from the second adhesive portion, and wherein the modulus of elasticity of the second adhesive portion is smaller than the modulus of elasticity of the first adhesive portion.

(2) In the display device according to (1) described above, the first adhesive portion and the second adhesive portion are formed by curing an identical ultraviolet curable resin under different conditions and the crosslinking density of the second adhesive portion is lower than that of the first adhesive portion.

(3) In the display device according to (1) described above, the first adhesive portion and the second adhesive portion comprise ultraviolet curable resins of different compositions.

(4) According to a first aspect of the present invention, a method of manufacturing a display device includes a step of bonding a panel-like member to a display panel by using an adhesive, in which the step includes a first step of coating an ultraviolet curable resin to the surface of the panel-like member or the display panel, a second step of closely bonding the panel-like member and the display panel by an uncured ultraviolet curable resin, and a third step of irradiating the ultraviolet curable resin with a predetermined amount of ultraviolet rays, wherein the third step has a step of irradiating with ultraviolet rays the entire ultraviolet curable resin and a step of irradiating with ultraviolet rays only a circular region extending along the outer periphery of the ultraviolet curable resin, and wherein the amount of ultraviolet rays irradiated in each of the steps is such an amount of light that the curing reaction for the ultraviolet curable resin proceeds to an intermediate stage and the circular region is completely cured.

(5) According to a third aspect of the present invention, a method of manufacturing a display device includes a step of bonding a panel-like member to a liquid crystal display panel by using an adhesive, the step comprising:

a first step of coating a first ultraviolet curable resin in a circular shape to the surface of the panel-like member or the display panel, a second step of coating a second ultraviolet curable resin to the surface of the panel-like member or the display panel in a region surrounded by the first ultraviolet curable resin or a region overlapping with the region, and a third step of closely bonding the panel-like member and the display panel by the first ultraviolet curable resin and the second ultraviolet curable resin, and a fourth step of irradiating with a predetermined amount of ultraviolet rays the first ultraviolet curable resin and the second ultraviolet curable resin, thereby curing the same, wherein a modulus of elasticity of the second ultraviolet curable resin after the fourth step is smaller than a modulus of elasticity of the first ultraviolet curable resin.

(6) In the method of manufacturing a display device according to (5) described above, the first step is set such that, after the coating of the first ultraviolet curable resin, a the first ultraviolet curable resin is irradiated with a predetermined amount of ultraviolet rays and its curing reaction proceeds to an intermediate stage.

(7) In the method of manufacturing a display device according to (5) above, the first ultraviolet curable resin coated in the first step is made of a resin material having a higher viscosity than the second ultraviolet curable resin coated in the second step.

(8) In the method of manufacturing a display device according to (5) above, the first ultraviolet curable resin is formed in an intermittent circular shape when coated in the first step and formed in a closed circular shape in the third step.

According to the display device of the invention and a manufacturing method thereof, the reliable bonding strength and high reparability are compatible when the panel-like member is bonded to the display panel.

DESCRIPTION OF THE PREFERRED EMBODIMENTS

Figure 1:
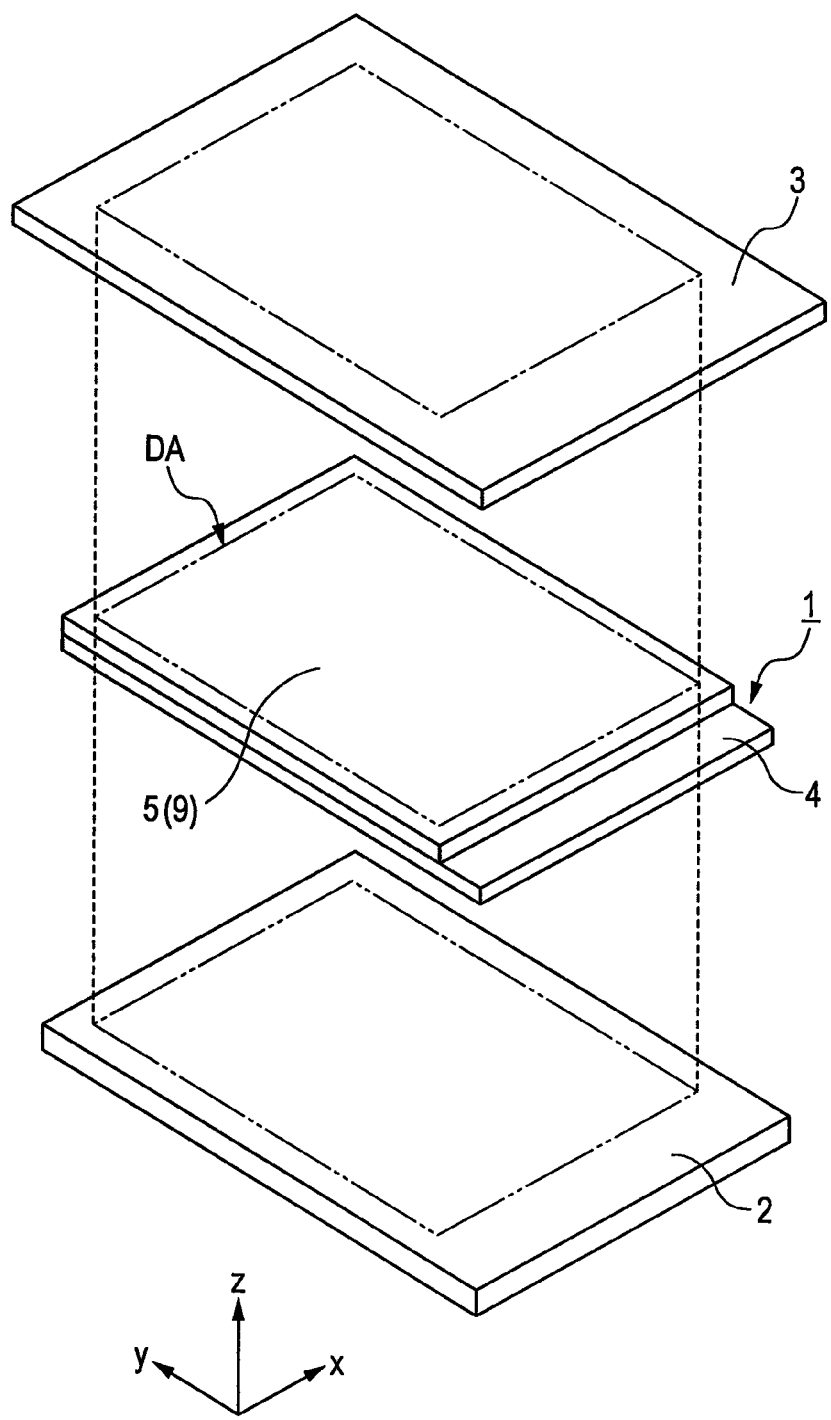
FIG. 1 is a schematic perspective view showing an example of an outlined configuration of a principal portion in a display device according to the invention.

The present invention will be described specifically together with preferred embodiments (examples) with reference to the drawings.

Throughout the drawings of assistance for explaining the examples, those having identical function carry the same reference numerals for which duplicate description will be omitted.

Further, in the following description, a liquid crystal display device having a liquid crystal display panel will be described as an example of a display device to which the present invention is applied.

FIGS. 1 to 5 are schematic views of assistance for explaining the principle of the invention.

Figure 2:
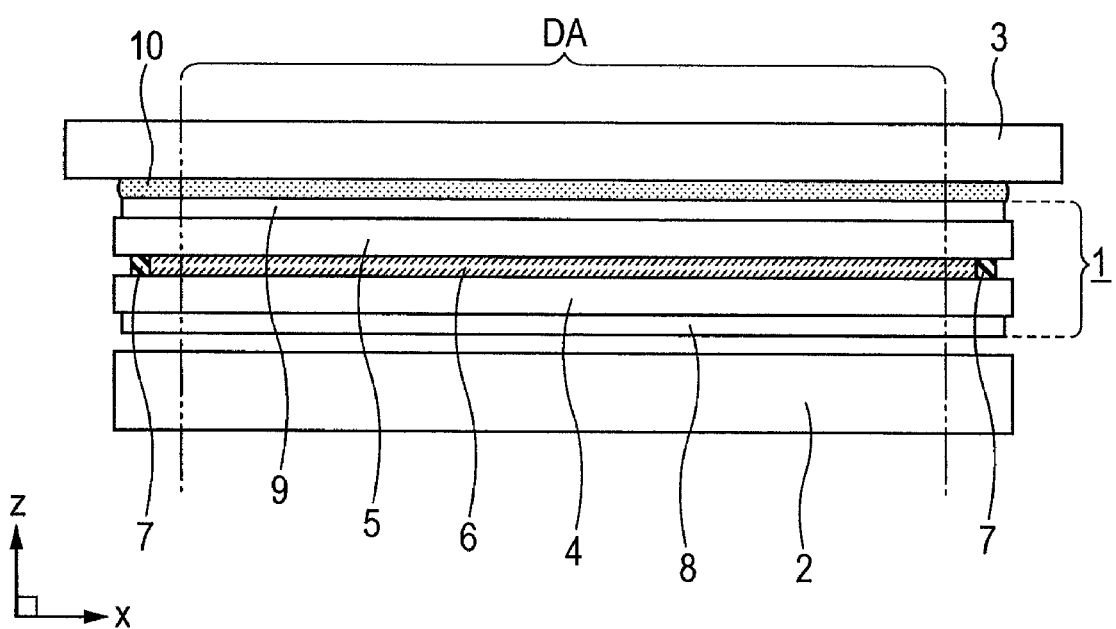
FIG. 2 is a schematic cross sectional view showing an example of an outlined configuration of a principal portion in a display device according to the invention.
Figure 3:
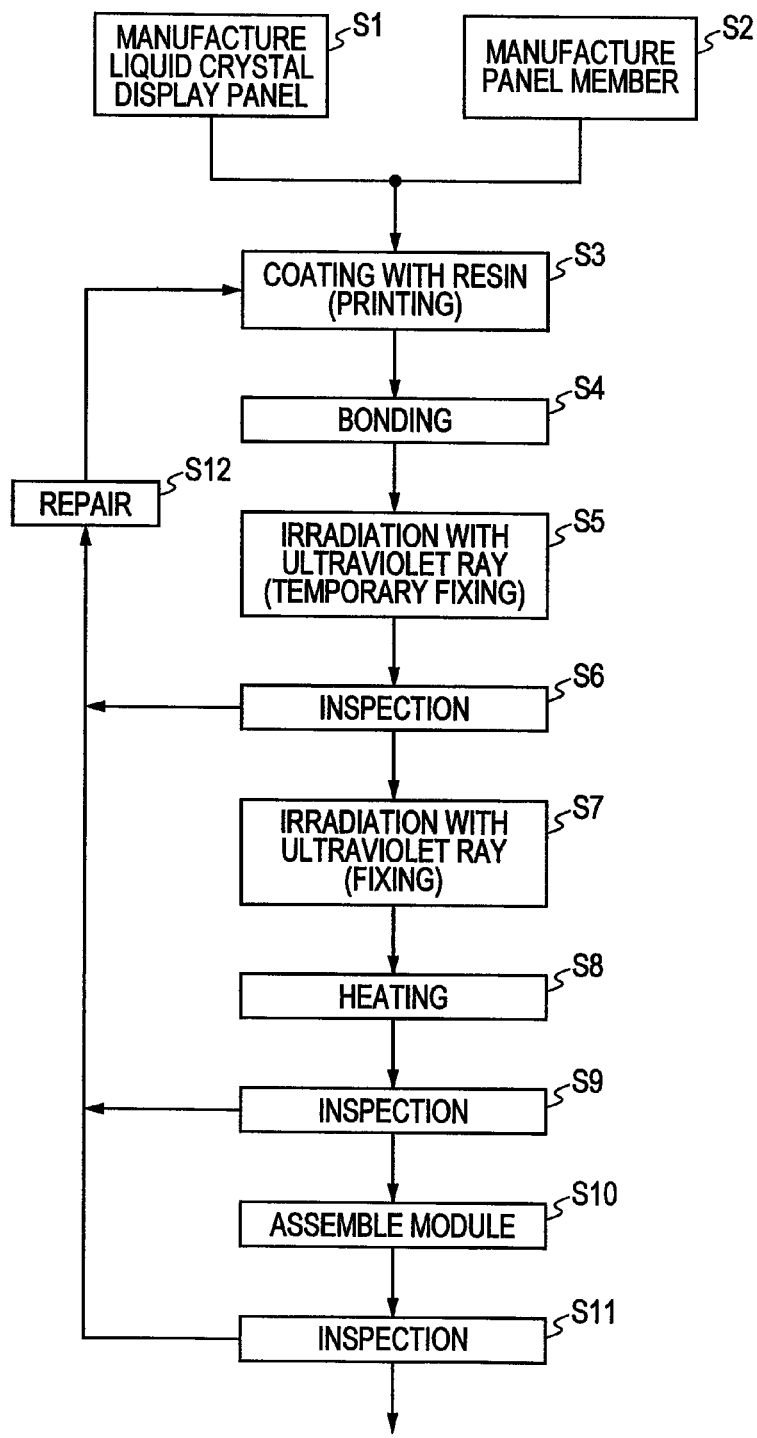
FIG. 3 is a schematic flow chart showing an example of main procedures in the method of manufacturing a display device according to the invention.
Figure 4:
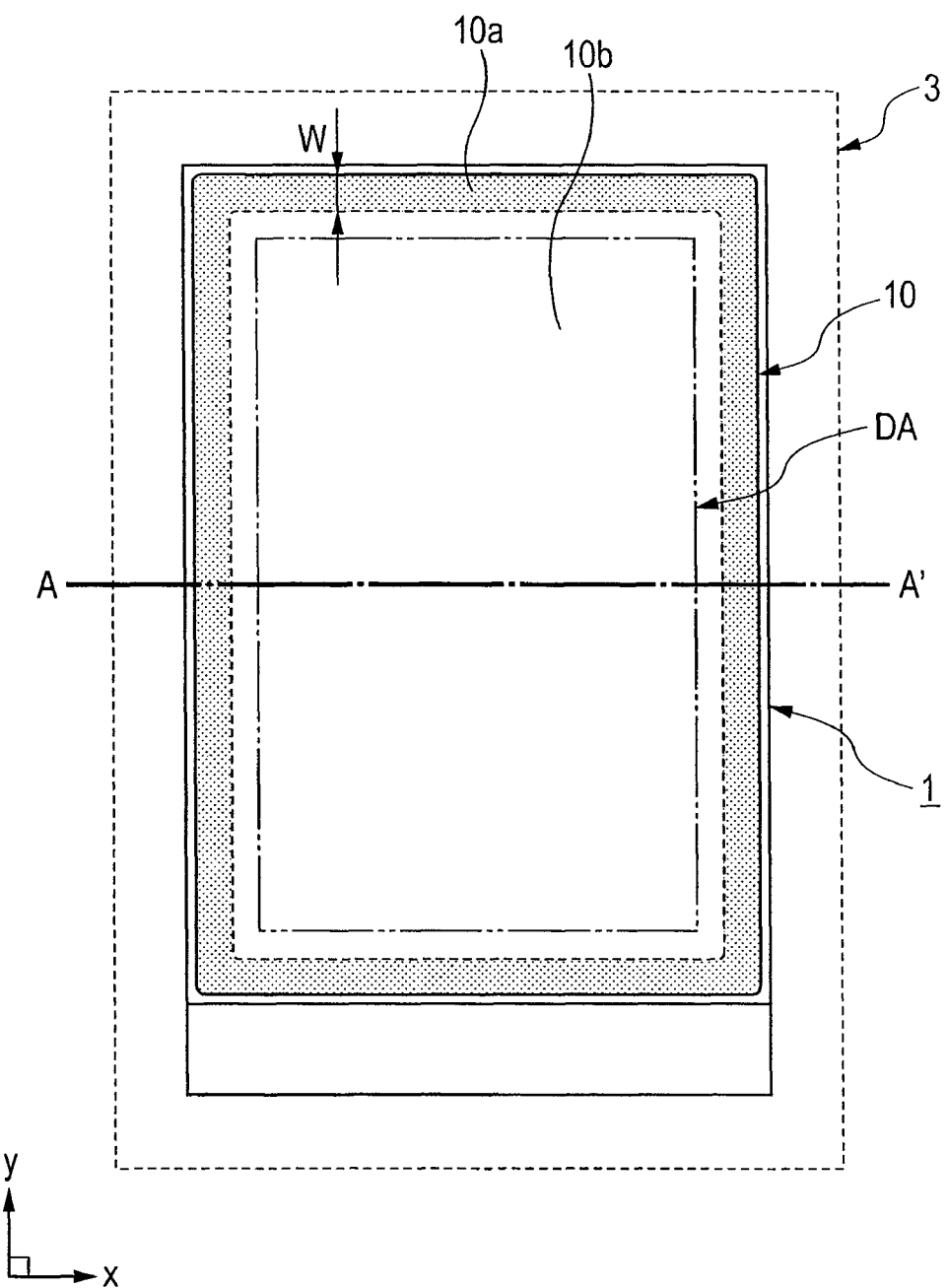
FIG. 4 is a schematic plan view showing an example of a planer configuration of an adhesive in a display device according to the invention.
Figure 5:
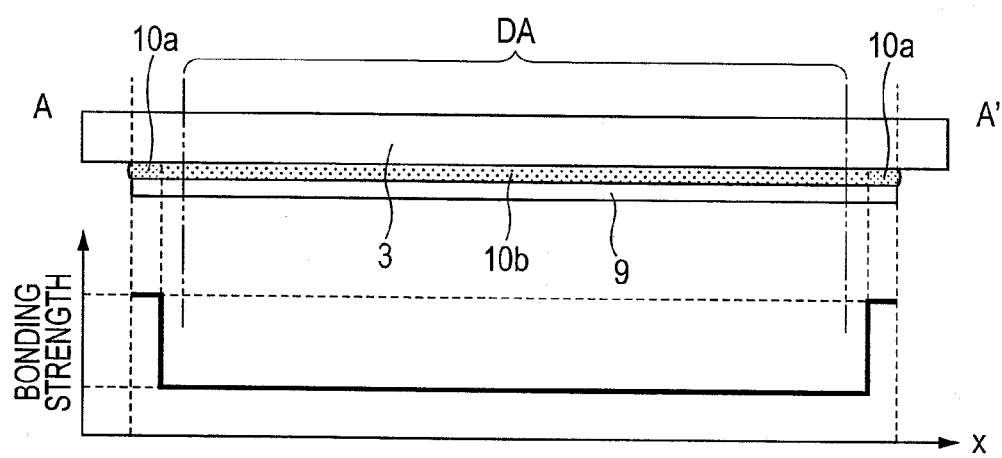
FIG. 5 is a schematic view showing an example of a bonding strength between a panel-like member and a polarizing plate at apposition along line A-A' in FIG. 4.

FIG. 1 is a schematic perspective view showing an example of an outlined configuration for a main portion in a liquid crystal display device according to the invention. FIG. 2 is schematic a cross sectional view showing an example of a schematic configuration for a main portion in the liquid crystal display device according to the invention. FIG. 3 is a schematic flow chart showing an example of main procedures in the method of manufacturing a liquid crystal display device according to the invention. FIG. 4 is a schematic plan view showing an example of a planar configuration of an adhesive in the liquid crystal display device according to the invention. FIG. 5 is a schematic view showing an example of a bonding strength between a panel-like member and a polarizing plate at a position along line A-A' in FIG. 4.

FIG. 2 is an example of a cross sectional configuration as viewed in a plane parallel with the zx-plane in an xyz orthogonal coordinate system shown in FIG. 1.

The liquid crystal display device according to the invention includes, for example, a liquid crystal display panel 1, a backlight 2, and a panel-like member 3 as shown in FIGS. 1 and 2.

The liquid crystal display panel 1 has a first substrate 4, a second substrate 5, a liquid crystal layer 6, a seal member 7, a first polarizing plate 8, and a second polarizing plate 9. The liquid crystal panel 1 in the liquid crystal display device according to the invention is, for example, a color TFT liquid crystal display panel of active matrix driving type, which configuration has already been well-known. Further, the invention is applicable irrespective of the configuration of the liquid crystal display panel 1. Accordingly, in the present specification, the configuration of the liquid crystal display panel 1 is not described in details.

The backlight 2 is an illumination device for obtaining planar light to illuminate the liquid crystal display panel 1. The backlight has one or more light sources and optical parts for converting the light emitted from the light sources into planar light, etc. Concrete configurations of the backlight 2 have also been well-known. Further, the invention is applicable irrespective of the configuration of the backlight 2. Accordingly, the present specification does not explain the configuration of the liquid crystal display panel 1 in details.

The panel-like member 3 is a protective cover for protecting the liquid crystal display panel 1 when the liquid crystal display device according to the invention is used, for example, as a display device for a mobile electronic device, and this is a plate-like member comprising a transparent resin such as an acrylic resin. The panel-like member 3 is bonded to the liquid crystal display panel 1 (specifically, second polarizing plate 9) by an adhesive (also including pressure sensitive adhesive) 10 as shown, for example, in FIG. 2. The adhesive 10 comprises, for example, an ultraviolet curable resin such as SVR 1240 manufactured by Sony Chemical and Information Device Corporation.

The liquid crystal display device having such a configuration is manufactured by procedures as shown, for example, in FIG. 3.

First of all, the following steps are performed in parallel: a step S1 for manufacturing the liquid crystal display panel 1; a step S2 for manufacturing the panel-like member 3; and a step of manufacturing a not illustrated backlight 2. The manufacturing method for the liquid crystal display panel 1, the manufacturing method for the panel-like member 3, and the manufacturing method for the backlight 2 each have already been well-known. Accordingly, the present specification does not explain the manufacturing method of them in details.

Then, a step S3 is performed for coating or printing an optical resin, for example, an ultraviolet curable resin 10' on the surface of the liquid crystal display panel 1 or the panel-like member 3.

Then, a step S4 is performed for bonding the liquid crystal display panel 1 and the panel-like member 3 to each other by way of the coated or printed ultraviolet curable resin 10'. In this case, the ultraviolet curable resin 10' is in an uncured state (varnish-like state) and has fluidity. Accordingly, a step S5 is performed for temporarily fixing a positional relation between the liquid crystal display panel 1 and the panel-like member 3 by irradiating with ultraviolet rays a portion of the ultraviolet ray curable region 10'.

Then, a step S6 is performed for inspecting whether or not foams are formed inside the ultraviolet curable resin 10', at the boundary between the ultraviolet curable resin 10' and the liquid crystal display panel 1, and at the boundary between the ultraviolet curable resin 10' and the panel-like member 3. Portions judged as not containing foams in the inspection step S6 are then subjected to a step S7 of irradiating with ultraviolet rays the entire ultraviolet curable resin 10' to completely cure the same and regularly fixing the positional relation between the liquid crystal display panel 1 and the panel-like member 3.

While the ultraviolet curable resin 10' develops a function as the adhesive 10 for adhering the panel-like member 3 to the liquid crystal display panel 1 by the step S7 of irradiating with the ultraviolet rays thereover, the bonding strength is sometimes insufficient depending on the type of the ultraviolet curable resin 10' used. Therefore, a step S8 is performed for heating the liquid crystal display panel 1 bonded with the panel member 3 to enhance the bonding strength of the ultraviolet curable resin 10' (adhesive 10).

Then, a step S9 is performed for inspecting, for example, as to whether adhesion failure is present or not for the panel-like member 3. A component which has been judged as involving no adhesion failure in the inspection step S9 is transferred to an assembling step S10 for a liquid crystal display module (liquid crystal display device).

Then, a step S11 of conducting lighting up test, etc. is performed for inspecting whether or not the liquid crystal display module involves a problem in terms of display quality. A component that has been judged as involving no problem for the display quality in the inspection step S11 is transferred, for example, to assembling steps of the portable electric device, etc., and contained together with a printed circuit board in a casing.

In the manufacturing method described above, a product having been judged to involve a problem in any of the three inspection steps S6, S9, and S11 described above is usually transferred to a step S12 referred to as repairing and subjected to the operation for re-utilizing the liquid crystal display panel 1 or the panel-like member 3. For instance, in a case where foams are formed inside the ultraviolet curable resin 10' in the first inspection step 6, the panel-like member 3 is peeled from the liquid crystal display panel 1 to remove the ultraviolet curable resin 10' in the repairing step S12. In the same manner, in a case where adhesion failure has been caused in the second inspection step S9 and also in a case where a problem with the display quality found in the third inspection step S11 is caused by bonding between the liquid crystal display panel 1 and the panel-like member 3, the panel-like member 3 is peeled from the liquid crystal display panel 1 to remove the adhesive 10 (ultraviolet curable resin) in the repairing step S12. Then, in a case where the panel-like member 3 and the liquid crystal display panel 1 involve no problem after peeling, the panel-like member 3 and the liquid crystal display panel 1 are re-utilized.

Most portion of the ultraviolet curable resin 10' upon the execution of the first inspection step S6 is not yet cured and has fluidity, so that the bonding strength between the liquid crystal display panel 1 and the panel-like member 3 is low. Accordingly, it is relatively easy to perform the operation of peeling the panel-like member 3 from the liquid crystal display panel 1 or the operation of removing the ultraviolet curable resin 10' performed in this state.

However, when the second inspection step S9 and the third inspection step S11 are executed, the ultraviolet curable resin (adhesive 10) has already been cured, so that the bonding strength between the liquid crystal display panel 1 and the panel-like member 3 is increased. Therefore, in a case where a problem is found in the second inspection step S9 or the third inspection step S11, and the panel-like member 3 is peeled from the liquid crystal display panel 1, the panel-like member 3 has to be peeled by applying an extremely large force. Therefore, the panel-like member 3 may possibly be deformed plastically, or the liquid crystal display panel 1 may possibly be broken.

Further, in a case where a problem is found in the third inspection step S11 and the panel-like member 3 is peeled from the liquid crystal display panel 1, the assembled liquid crystal display module, for example, has to be deassembled in some cases.

That is, the existent method of manufacturing the liquid crystal display device of bonding the panel-like member 3 to the liquid crystal display panel 1 involves a problem, for example, that the re-utilization ratio of the liquid crystal display panel 1 and the panel-like member 3 is low. This lowers the production yield of the liquid crystal display devices and lowers the production efficiency of the liquid crystal display devices.

Further, in the case where the surface of the panel-like member 3 is injured during the use of portable electronic device and replacement of the panel-like member 3 is necessary, the liquid crystal display panel 1 may be broken upon peeling of the panel-like member 3 in the liquid crystal display device manufactured by the existent manufacturing method. Then, this causes a problem that also the liquid crystal display panel 1, which is not necessary to be replaced, would have to be replaced.

To address such a problem, the solution in mind is to lower the bonding strength between the adhesive 10 and the liquid crystal display panel 1 and the bonding strength between the adhesive 10 and the panel-like member 3 thereby facilitating the peeling of the panel-like member 3 from the liquid crystal display panel 1. However, when the bonding strength is lowered, it causes another problem, for example, that the panel-like member 3 tends to peel off the liquid crystal display panel 1 during the use of the portable electronic device.

In view of the above, when the panel-like member 3 is bonded to the liquid crystal display panel 1 by using the adhesive 10, it is desirable to use such an adhesive material, as the adhesive 10 that can maintain a high bonding strength during the use of the liquid crystal display (mobile electronic device) and allows the panel-like member 3 to peel off with ease when it is necessary to peel the panel-like member 3 from the liquid crystal display panel 1. However, there are not many adhesion materials which have the property described above within a range of the temperature where the use of the liquid crystal display device is intended and can be used as the adhesive 10.

Then, the present inventors have studied a method capable of maintaining a high bonding strength during the use of the liquid crystal display device (mobile electronic device) and easily peeling the panel-like member from the liquid crystal display panel 1 by using an ultraviolet curable resin used in the existent manufacturing method. As a result, the present inventors have found that this can be attained, for example, by making the bonding strength different between the outer peripheral portion and the central portion of the adhesive 10, thereby making the bonding strength of the central portion lower than that of the outer peripheral portion as shown in FIGS. 4 and 5.

When the panel-like member 3 peels off the liquid crystal display panel 1 due to some or other reasons during the use of the liquid crystal display device, peeling usually occurs at the outer peripheral portion. Accordingly, peeling of the panel-like member 3 during use can be prevented if the high bonding strength is applied to the outer peripheral portion of the adhesive 10, in other words, a circular portion which is outside of the display area DA of the liquid crystal display panel 1 and surrounds the display area DA (hereinafter referred to as a first adhesive portion 10a).

Further, it may become necessary to peel the panel-like member 3 from the liquid crystal display panel 1. In such a case, if the bonding strength of the central portion of the adhesive 10, that is, that of the adhesive prevailing in the region surrounded by the first adhesive portion 10a (hereinafter referred to as a second adhesive portion 10b) is made lower, the panel-like member 3 can be peeled easily from the liquid crystal display panel 1 once the first adhesive portion 10a is peeled.

It is disclosed, for example, in JP-A-2009-109537 to increase the bonding strength of the outer peripheral portion of the adhesive 10 than the bonding strength of the central portion when the two members are adhered by using the adhesive 10 as in the present invention. However, in the method described in this patent document, plasmas or ultraviolet rays are irradiated a portion of the surface of a member for which the bonding strength is intended to be increased by using the adhesive 10, thereby enhancing the bonding strength of the portion. Accordingly, if the method described in the patent document is applied to the step of bonding the panel-like member 3 to the liquid crystal display panel 1, then a step of irradiating with plasmas or ultraviolet rays the outer peripheral portion of the panel-like member 3 or the liquid crystal display panel 1 is required. Further, the method described in the patent document enhances the bonding strength by irradiating with the plasmas or the ultraviolet rays thereby cleaning the surface of the member. Accordingly, to re-utilize the panel-like member 3 or the liquid crystal display panel 1 after the peeling of the panel-like member 3 from the liquid crystal display panel 1 in the repairing step S12, it may be necessary to again clean the panel-like member 3 or the liquid crystal display panel 1.

By contrast, the present invention is configured such that the first adhesive portion 10a of the adhesive 10 has a physical property (for example, a modulus of elasticity) different from that of the second adhesive portion 10b of the adhesive 10, thereby making the bonding strength different at the respective portions. This method has no requirement for applying any special treatment to the surface of the panel-like member 3 and the liquid crystal display panel 1 for the purpose of changing the bonding strength, and so the efficiency in the step of bonding the panel-like member 3 to the liquid crystal display panel 1 can be prevented from being reduced. Further, according to this method, the panel-like member 3 or the liquid crystal display panel 1 obtained in the repairing step S12 can be re-utilized with ease.

When the panel-like member 3 is bonded to the liquid crystal display panel 1 with the resin adhesive 10 such as an ultraviolet curable resin, their bonding strength is substantially in proportion to the modulus of elasticity. Accordingly, to lower the modulus of elasticity of the second adhesive portion 10b as compared with the modulus of elasticity of the first adhesive portion 10a, the second adhesive portion 10b of the adhesive 10 has only to have a bonding strength lower than that of the first adhesive portion 10a of the adhesive 10.

Changing the modulus of elasticity of the first adhesive portion 10a and the second adhesive portion 10b of the adhesive 10 provides a variation in the modulus of elasticity at the boundary between the first adhesive portion 10a and the second adhesive portion 10b. The modulus of elasticity of the resin material is determined usually based on the molecular structure, crosslinking density, etc. When the molecular structure or the crosslinking density changes, the optical transmittance or birefringence (refractive index anisotropy) may sometimes change accordingly. Thus it is desirable that the boundary between the first adhesive portion 10a and the second adhesive portion 10b be defined outside of the display area DA of the liquid crystal display panel 1 as shown in FIG. 4.

Further, the first adhesive portion 10a of the adhesive 10 needs to have such a bonding strength that the panel-like member 3 does not peel off the liquid crystal display panel 1 during the use of the liquid crystal display device as described above. In this case, the index of the bonding strength required for the first adhesive portion 10a is, for example, a stress (tension) attributable to elongation and shrinkage of the panel-like member 3 caused by heat (temperature change) which is generated during the use of the liquid crystal display device. The stress due to the elongation and shrinkage of the panel-like member 3 concentrates on the end of the boundary (outer peripheral portion) between the panel-like member 3 and the adhesive 10, and the end of the boundary between the liquid crystal display panel 1 and the adhesive 10 (outer peripheral portion). Accordingly, it is considered that the panel-like member 3 can be prevented from peeling off the liquid crystal display panel 1 during the use of a liquid crystal display device as long as the first adhesive portion 10a of the adhesive 10 has a bonding strength enough to withstand the stress (tension) generated at the boundary with the panel-like member 3 and at the boundary with the liquid crystal display panel 1.

The stress (tension) generated at the boundary between the panel-like member 3 and the first adhesive portion 10a of the adhesive 10, and at the boundary between the liquid crystal display panel 1 and the first adhesive portion 10a of the adhesive 10 is different depending on the amount of warp caused in the panel-like member 3. The amount of warp in the panel-like member 3 is generally larger as the panel-like member 3 has a higher Young's modulus and the thickness of the panel-like member 3 is larger. Accordingly, the bonding strength required for the first adhesive portion 10a of the adhesive 10 is different in accordance with the amount of warp caused in the panel-like member 3. However, it is not efficient and not practical, for example, to select the resin material to be used as the adhesive 10 in accordance with the amount of warp caused in the panel-like member 3.

Accordingly, in the manufacturing method of the liquid crystal display device according to this invention, it is desirable, for example, to use a general-purpose ultraviolet curable resin as the adhesive 10 and properly change the width of the first adhesive portion 10a, thereby obtaining a desired bonding strength.

Figure 6:
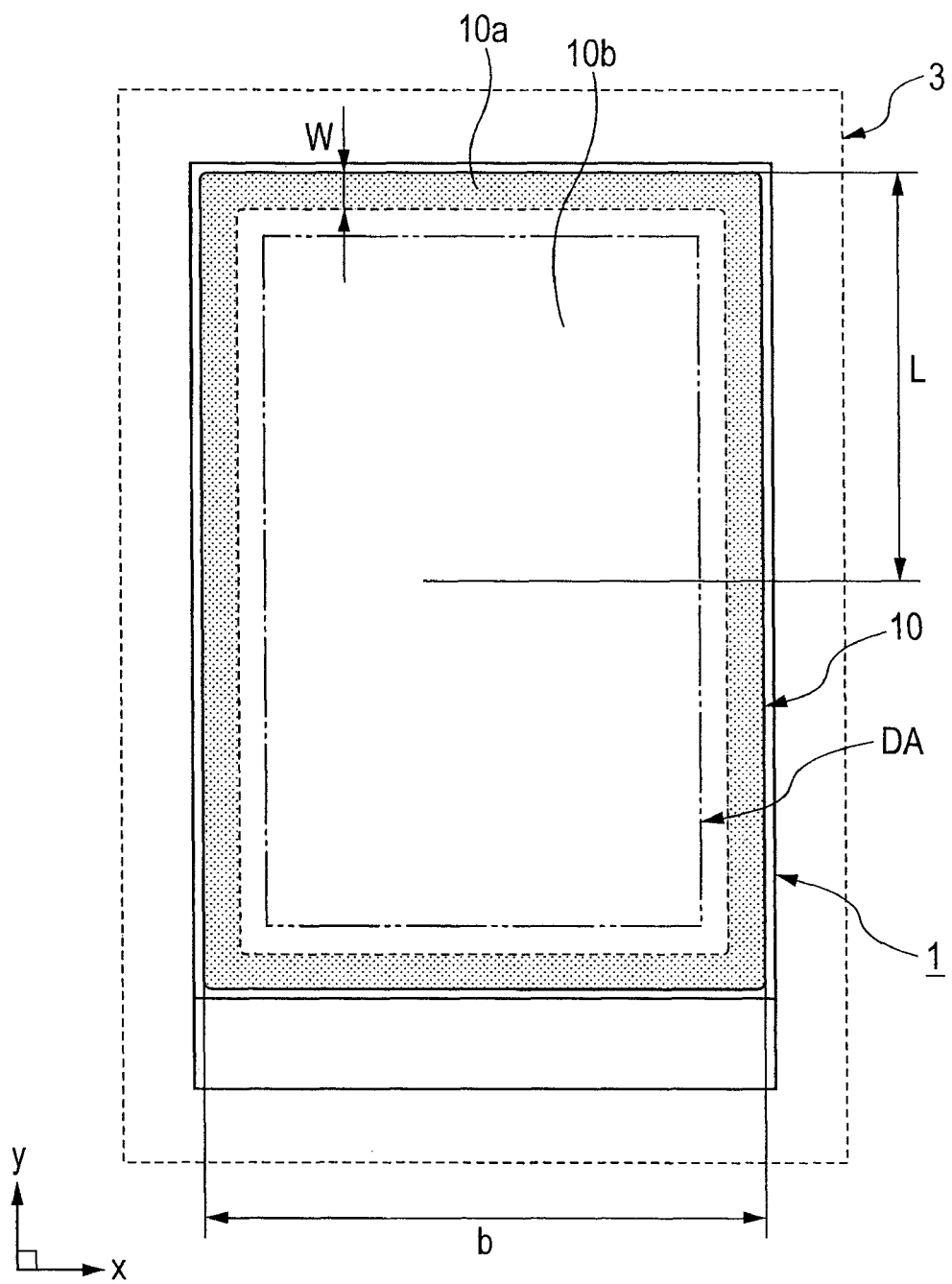
FIG. 6 is a schematic plan view showing several definitions of parameters used for the calculation of stress to be generated.
Figure 7:
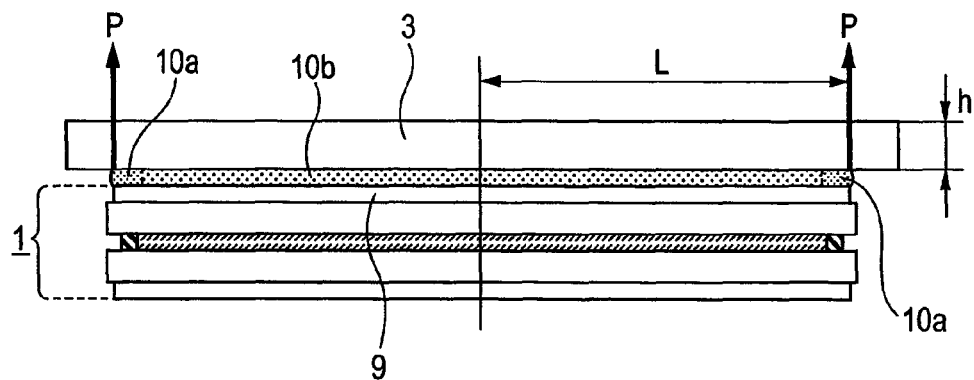
FIG. 7 is a schematic cross sectional view showing several definitions of parameters used for the calculation of stress to be generated.
Figure 8:
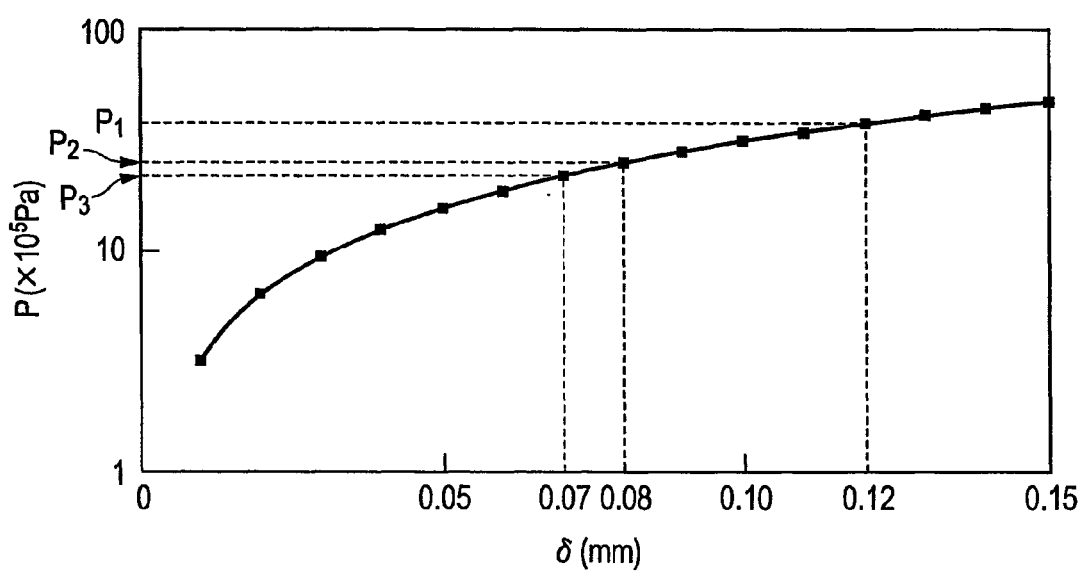
FIG. 8 is a graph showing an example of a relation between the amount of warp and the stress to be generated in a panel-like member.

FIGS. 6 to 8 are schematic views of assistance for explaining an example of a method of setting a width for the first adhesive portion of the adhesive.

FIG. 6 is a schematic plan view showing several definitions for parameters used for the calculation of stress to be generated. FIG. 7 is a schematic cross sectional view showing several definitions for parameters used for the calculation of stress to be generated. FIG. 8 is a graph showing an example of a relation between the amount of warp and the stress to be generated in the panel-like member.

When the outer shape of the liquid crystal display panel 1 in a plan view is substantially a rectangular shape as exemplified in the present specification, the adhesion surface between the panel-like member 3 and the adhesive 10 is also a substantially rectangular shape as shown in FIG. 6. The amount of warp of the panel-like member 3 caused by the temperature change is largest at the side distant from the center, that is, at the peripheral side of the shorter side. Accordingly, it is desired that the width W for the first adhesive portion 10a of the adhesive 10 be determined based on the stress generated in portions of the first adhesive portion 10a at a region along the shorter side of the panel-like member 3.

When the panel-like member 3 warps, the stresses (tension) are generated at the boundary between the panel-like member 3 and the first adhesive portion 10a of the adhesive 10 and at the boundary between the liquid crystal display panel 1 and the first adhesive portion 10a of the adhesive 10. Such stresses concentrate on the outer peripheral portion of the adhesive 10 as described above. In this case, the distance from the center to the shorter side of the adhesion surface of the adhesive 10 is assumed as L and the amount of warp of the panel-like member 3 at the periphery of the shorter side of the adhesive 10 is assumed as δ as shown in FIGS. 6 and 7. Then, the stress P generated at the shorter side portion of the adhesive 10 is represented by the following formulas (1) and (2).

$$P = \delta \times \frac{3E_p \times I}{L^3} \qquad \text{(Formula 1)}$$

$$I = \frac{b \times h^3}{12} \qquad \text{(Formula 2)}$$

In the formula 1, $E_p$ represents the Young's modulus of the panel-like member 3. In the formula 2, b represents the size in the direction of the shorter side of the panel-like member 3 and h represents the thickness of the panel-like member 3.

When the material of the panel-like member 3 is an acrylic resin, the Young's modulus $E_p$ is about $3.2 \times 10^9$ (Pa=N/m²). Accordingly, when a relation is determined, based on the formula 1 and the formula 2, between the amount of warp δ and the generated stress P in the panel-like member 3 in a small-sized liquid crystal display device, they are, for example, in a relation as shown in FIG. 8.

FIG. 8, is a graph showing the amount of warp δ (mm) of the panel-like member 3 on the abscissa and the generated stress P ($\times 10^5$ Pa) on the ordinates. Square solid dots represent a relation between the amount of warp δ and the stress P calculated from the formula 1 and the formula 2. Further, a graph in FIG. 8 shows a result of calculation assuming the size b in the direction of the shorter side of the panel-like member 3 as 52.04 mm, the thickness h of the panel-like member 3 as 1.3 mm, and the distance L from the center to the shorter side of the adhesion plane as 39.6 mm. Further, the ordinate in the graph of FIG. 8 is expressed by the logarithmic scale.

As can be seen from FIG. 8, as the amount of warp δ of the panel-like member 3 increases, the stress P generated in the shorter side portion of the adhesive 10 also increases, and the differentiation (increment) thereof becomes gentle as the amount of warp δ of the panel-like member 3 increases.

In the graph shown in FIG. 8, the stress $P_1$ generated by the amount of warp δ of 0.12 mm in the panel-like member 3 is about $37.3 \times 10^5$ Pa. Accordingly, when the allowable value for the amount of warp δ in the panel-like member 3 is assumed as 0.12 mm, a bonding strength enough to withstand the stress (tension) of $P_1 \times 10^5$ Pa is required for the first adhesive portion 10a of the adhesive 10. In this case, the width required for the first adhesive portion 10a can be determined based on the linear bonding strength of the ultraviolet curable resin used as the adhesive 10.

The warp caused in the panel-like member 3 is mainly attributable to the increase of temperature in the liquid crystal display device and the periphery thereof, and the amount of warp δ is larger as the temperature is higher. Further, the ultraviolet curable resin used as the adhesive 10 is such that the bonding strength is generally lowered as the temperature is higher. Accordingly, the allowable value for the amount of warp δ of the panel-like member 3 is smaller, for example, as the maximum reached temperature becomes higher for the liquid crystal display device and the periphery thereof during use.

For example, when the maximum reached temperature for the liquid crystal display device and the periphery thereof during use is at 70° C., the allowable value for the amount of warp δ of the panel-like member 3 is about 0.12 mm. Accordingly, the width W for the first adhesive portion 10a of the adhesive 10 is set at a value enough to ensure the bonding strength that can withstand the stress (tension) of $P_1 \times 10^5$ Pa.

Further, when the maximum reached temperature for the liquid crystal display device and the periphery thereof during use is at 80° C., the allowable value for the amount of warp δ of the panel-like member 3 is about 0.08 mm. Accordingly, the width W for the first adhesive portion 10a of the adhesive 10 is set at a value enough to ensure the bonding strength that can withstand the stress (tension) of $P_2 \times 10^5$ Pa (about $24.9 \times 10^5$ Pa).

Further, when the maximum reached temperature for the liquid crystal display device and the periphery thereof during use is at 85° C., an allowable value for the amount of warp δ of the panel-like member 3 is about 0.07 mm. Accordingly, the width W for the first adhesive portion 10a of the adhesive 10 is set at a value enough to ensure the bonding strength that can withstand the stress (tension) of $P_3 \times 10^5$ Pa (about $21.8 \times 10^5$ Pa).

Further, the graph shown in FIG. 8 is an example of a relation between the amount of warp δ and the generated stress P in the panel-like member 3. The relation between the amount of warp δ and the stress P varies depending on the Young's modulus and the thickness, and the size of the adhesion surface of the panel-like member 3. Accordingly, the width W for the first adhesive portion 10a of the adhesive 10 may be changed properly in consideration to them.

Further, in the liquid crystal display device according to the invention, it suffices to make the bonding strength of the second adhesive portion 10b lower than the bonding strength of the first adhesive portion 10a of the adhesive 10. As a result of the inventors' study, it has been found that the effect of the invention can be obtained sufficiently when the modulus of elasticity for the second adhesive portion 10b is small by about 3 digits as compared with the modulus of elasticity for the first adhesive portion 10a. Needless to say, it is desirable that the bonding strength of the second adhesive portion 10b be set as low as possible in view of the repairing workability, that is, the workability at the time of peeling of the panel-like member 3 from the liquid crystal display panel 1.

Several examples for the method of manufacturing a liquid crystal display device according to the invention are to be described. In the following examples, only the step of bonding the panel-like member 3 to the liquid crystal display panel 1 is explained in the method of manufacturing the liquid crystal display device according to the invention.

Example 1

Figure 9:
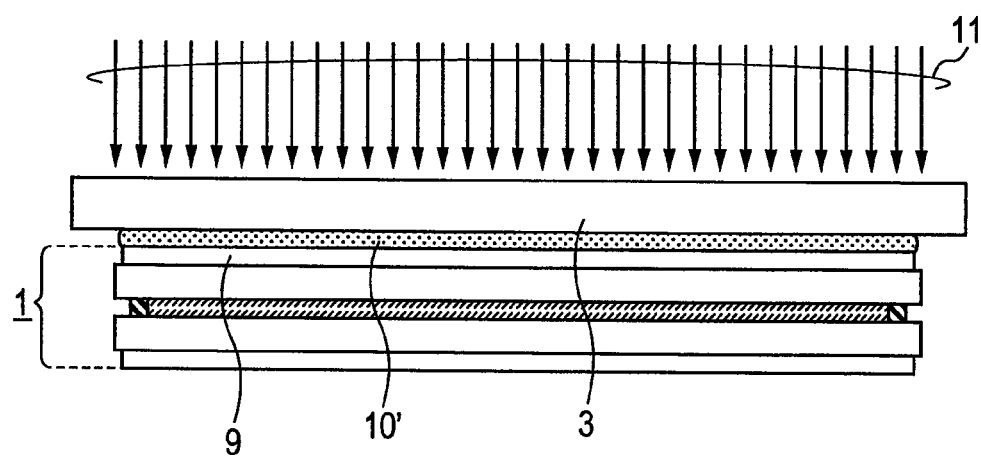
FIG. 9 is a schematic cross sectional view showing an example of a first stage in the step of curing an ultraviolet curable resin.
Figure 10:
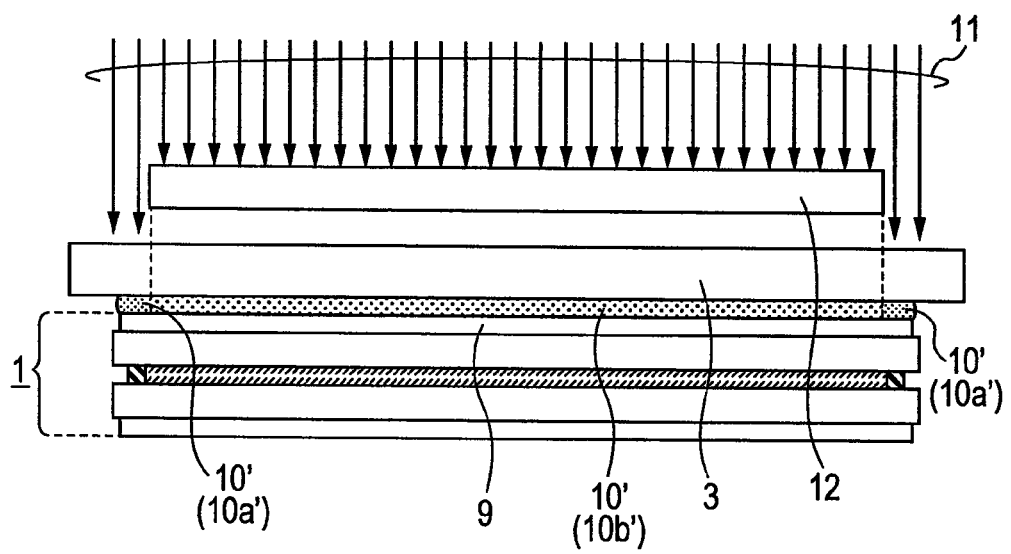
FIG. 10 is a schematic view showing an example of a second stage in the step of curing an ultraviolet curable resin.

FIGS. 9 and 10 are schematic views of assistance for explaining main steps in the method of manufacturing the liquid crystal display device of Example 1 according to the invention.

FIG. 9 is a schematic cross sectional view showing a first stage in the step of curing an ultraviolet curable resin. FIG. 10 is a schematic cross sectional view showing a second stage in the step of curing the ultraviolet curable resin.

In the method of manufacturing the liquid crystal display device in Example 1, the first adhesive portion 10a of the adhesive 10 is adapted to have a different bonding strength from the second adhesive portion 10b of the adhesive 10 by changing the irradiation condition of ultraviolet rays when the panel-like member 3 is bonded to the liquid crystal display panel 1 by using an ultraviolet curable resin.

When a radical reaction type ultraviolet curable resin is as the adhesive 10 for example, the radical reaction (curing reaction) proceeds more and the crosslinking density becomes higher as the larger amount of ultraviolet rays for irradiation is used. Further, the ultraviolet curable resin is such that the modulus of elasticity is higher and the bonding strength is higher as the crosslinking density becomes higher.

Procedures of bonding the panel-like member 3 to the liquid crystal display panel 1 in the method of manufacturing the liquid crystal display device of Example 1 are basically identical with existent procedures, and the steps S3 to S8 as shown in FIG. 3 are performed. However, in the method of manufacturing the liquid crystal display device of Example 1, the step S7 for completely curing an ultraviolet curable resin 10' for regular fixing is performed in the steps S3 to S8, for example, by the following procedures.

First, a step S3 is performed for coating or printing an uncured ultraviolet curable resin 10' to the panel-like member 3 or the liquid crystal display panel 1 in the same procedures as those in the existent case. Then, the following steps are performed: the step S4 of closely bonding the panel-like member 3 and the liquid crystal display panel 1 by the ultraviolet curable resin 10' and the step S5 of temporarily fixing them. Then, components judged as involving no problem in the subsequent inspection step S6 (with no foams) are transferred to the step S7 and fixed regularly by curing the ultraviolet curable resin 10' completely.

In this case, the entire surface of the ultraviolet curable resin 10 are irradiated with ultraviolet rays 11 at the step S7, for example, as shown in FIG. 9, in which case the ultraviolet rays 11 are irradiated such that the irradiation dose is, for example, at 800 mJ/mm² and the curing reaction of the ultraviolet curable resin 10' is stopped in an intermediate stage.

Then, as shown, for example, in FIG. 10, an ultraviolet ray mask 12 is disposed above the panel-like member 3, and only the outer peripheral portion of the ultraviolet curable resin 10' are irradiated with the ultraviolet rays 11. In this case, ultraviolet rays 11 are irradiated, for example, at an irradiation dose of 3,000 mJ/mm$^2$ and only the outer peripheral portion, that is, a region serving as the first adhesive portion 10a is completely cured.

Subsequently, at the step S8, the display panel 1 is heated at a predetermined temperature, so that the outer peripheral portion (first adhesive portion 10a) of the adhesive 10 has a bonding strength substantially equal with that manufactured by the existent procedures. On the other hand, the curing reaction is incomplete for the central portion (second adhesive portion 10b) of the adhesive 10 and the crosslinking density thereof is lower than that of the first adhesive portion 10a. Accordingly, the bonding strength of the second adhesive portion 10b is lower than that of the first adhesive portion 10a.

Therefore, adopting the method of manufacturing the liquid crystal display device of Example 1 (method of bonding the panel-like member 3 to the liquid crystal display panel 1) provides reliable bonding strength and high repairability when the panel-like member 3 is bonded to the liquid crystal display panel 1.

Needless to say, it is optional to preferentially perform whichever of the step of irradiating with the ultraviolet rays 11 the entire surface of the ultraviolet curable resin 10' or the step of irradiating with ultraviolet ray 11 only the outer peripheral portion thereof in the step S7.

Example 2

FIGS. 11 to 15 are schematic views of assistance for explaining main steps in the method of manufacturing the liquid crystal display device of Example 2 according to the invention.

Figure 11:
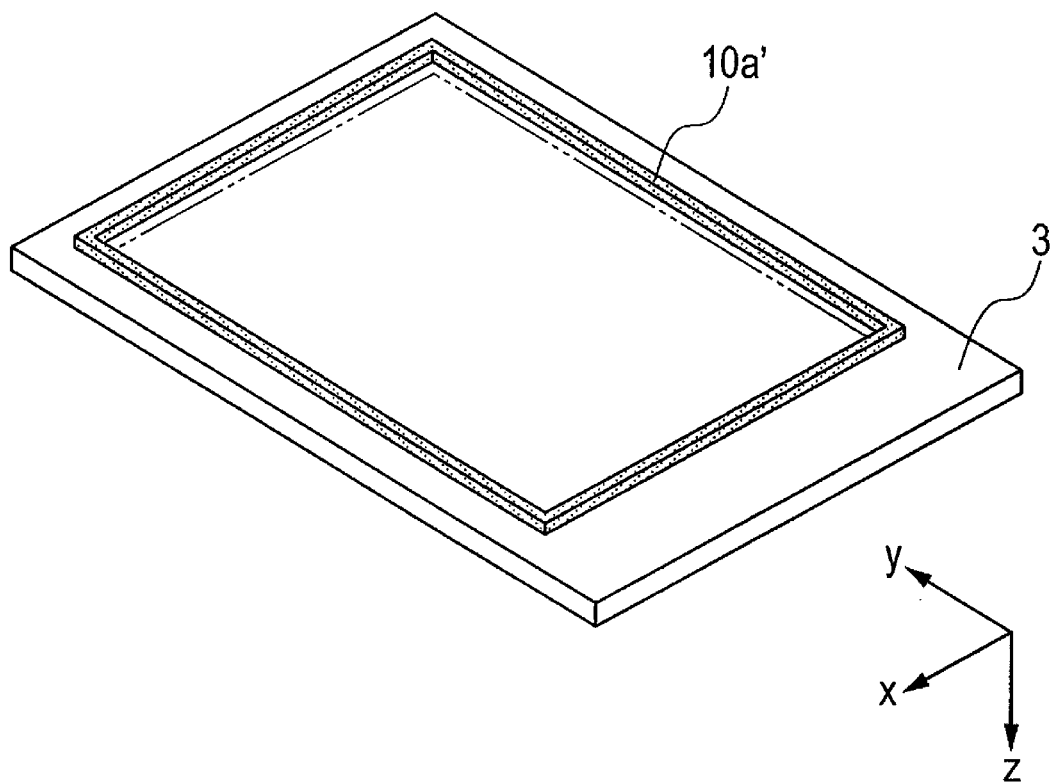
FIG. 11 is a schematic perspective view showing a first stage in the step of coating an uncured ultraviolet curable resin.
Figure 12:
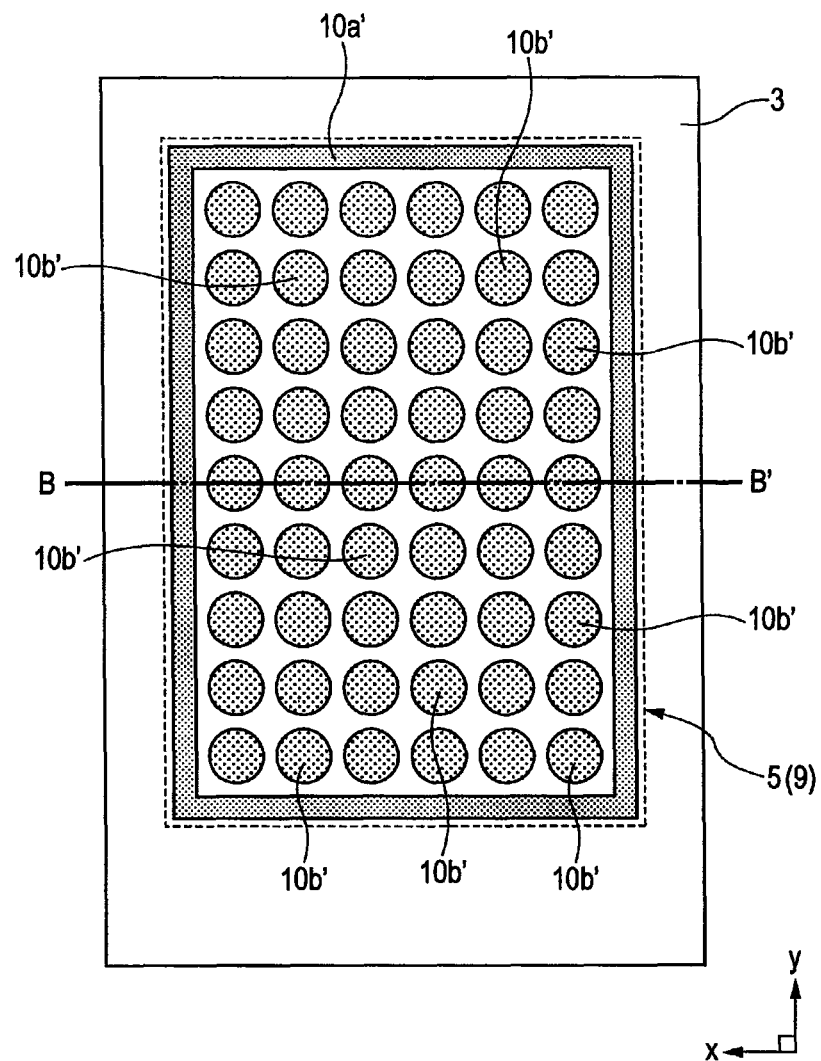
FIG. 12 is a schematic plan view showing a second stage in the step of coating an uncured ultraviolet curable resin.
Figure 13:
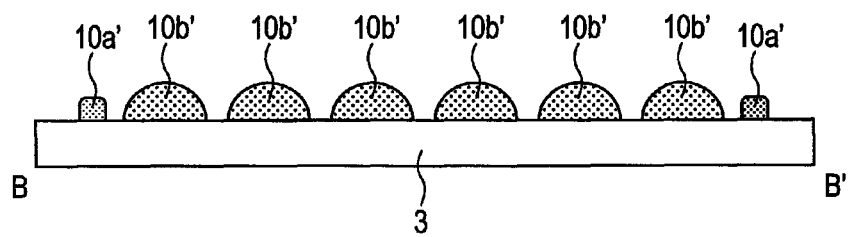
FIG. 13 is a schematic cross sectional view showing an example of a cross sectional configuration at a position along line B-B' in FIG. 12.
Figure 14:
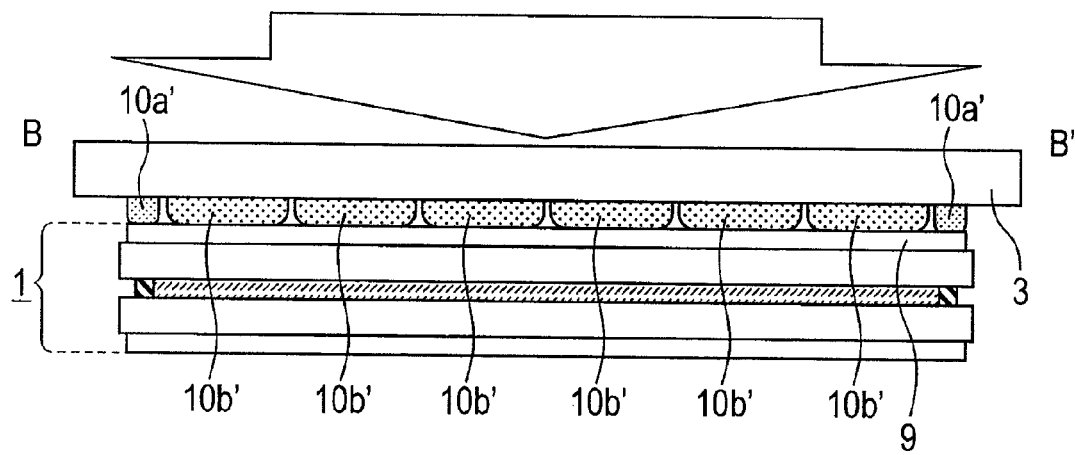
FIG. 14 is a schematic cross sectional view showing an example at an intermediate stage in the step of closely bonding a panel-like member to a display panel.
Figure 15:
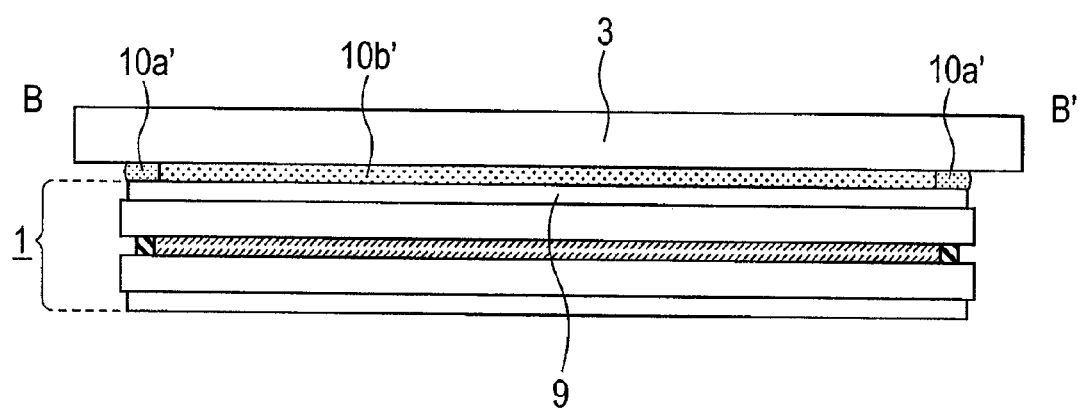
FIG. 15 is a schematic cross sectional view showing a state of closely bonding a panel-like member to a display panel.

FIG. 11 is a schematic perspective view showing a first stage in the step of coating an uncured ultraviolet curable resin. FIG. 12 is a schematic plan view showing a second stage in the step of coating the uncured ultraviolet curable resin. FIG. 13 is a schematic cross sectional view showing an example for the cross sectional configuration at the position along line B-B' in FIG. 12. FIG. 14 is a schematic cross sectional view showing an example of a stage in the course of the step of closely bonding the panel-like member to the liquid crystal display panel. FIG. 15 is a schematic cross sectional view showing the state in which the panel-like member is closely bonded to the liquid crystal display panel.

The method of manufacturing the liquid crystal display device of Example 1 is basically identical with the existent procedures and the entire ultraviolet curable resin 10' remains uncured in the step S4 of closely bonding the panel-like member 3 and the liquid crystal display panel 1. Therefore, the ultraviolet curable resin 10' may sometimes flow out and deposit to the lateral side of the liquid crystal display panel 1, for example, after the closely bonding of the panel-like member 3 and the liquid crystal display panel 1 and before the step S7 (before occurrence of curing reaction by the irradiation with ultraviolet rays 11).

By contrast, the method of coating the ultraviolet curable resin 10' to the panel-like member 3 or the liquid crystal display panel 1 is changed in the method of manufacturing the liquid crystal display device of Example 2. Thus the first adhesive portion 10a of the adhesive 10 has a different bonding strength from the second adhesive portion 10b of the adhesive 10 and the uncured ultraviolet curable resin is prevented from flowing out.

Procedures of bonding the panel-like member 3 to the liquid crystal display panel 1 in the method of manufacturing the liquid crystal display device of Example 2 are basically identical with existent procedures, and the steps S3 to S8 as shown in FIG. 3 are performed. However, in the method of manufacturing the liquid crystal display device of Example 2, the step S3 for coating an ultraviolet curable resin 10' in the steps S3 to S8 is performed, for example, by the following procedures.

First, as shown in FIG. 11, a first ultraviolet curable resin 10a' is coated on part of the surface of the panel-like member 3 in a circular shape, with the part of the surface being present outside of a central portion of the panel-like member 3 which will be stacked above the display area DA of the liquid crystal display panel 1. Then, the first ultraviolet curable resin 10a' is irradiated with ultraviolet rays at such an irradiation dose that the curing reaction proceeds to an intermediate stage (for example, at 800 mJ/mm$^2$).

Then, as shown in FIGS. 12 and 13, a second ultraviolet curable resin 10b' is coated or printed on a region surrounded by the first ultraviolet curable resin 10a'. In the example shown in FIGS. 12 and 13, while the second ultraviolet curable resin 10b' is coated in a dot matrix shape, the coating method of the second ultraviolet curable resin 10b' may be changed optionally.

Then, the panel-like member 3 is stacked over the liquid display panel 1, for example, in vacuum and the panel-like member 3 and the liquid crystal display panel 1 are closely bonded by the ultraviolet curable resins 10a' and 10b'. In this case, the second ultraviolet curable resin 10b' coated in the region surrounded by the first ultraviolet curable resin 10a' spreads as if the region (space) is filled with the second ultraviolet curable resin 10b', for example, as shown in FIG. 14. Then, finally, adjacent ultraviolet curable resins are in contact with each other and the second ultraviolet curable resin 10b' is made to fill the region surrounded by the first ultraviolet curable resin 10a' as shown in FIG. 15.

In this case, the second ultraviolet curable resin 10b' does not sometimes completely fill the region surrounded by the first ultraviolet ray curable resin 10a', resulting in fine gaps left. However, in the case where the panel-like member 3 and the liquid crystal display panel 1 are bonded to each other in vacuum, the gaps in question are put in a vacuum state. Accordingly, if the liquid crystal display panel bonded with the panel-like member 3 is put in atmospheric air, the gaps disappear and the region surrounded by the first ultraviolet curable resin 10a' is filled with the second ultraviolet curable resin 10b'.

Subsequently, procedures from the temporary fixing step S5 to the regular fixing step S7 are performed by the same procedures as those in the existent procedures. In the fixing step S7 for regular fixing, for example, the entire ultraviolet curable resins 10a' and 10b' are uniformly irradiated with ultraviolet rays. Then, the first ultraviolet curable resin 10a' is different from the uncured second ultraviolet curable resin 10b' in the ultraviolet ray irradiation dose and in the crosslinking density because the curing reaction of the first ultraviolet curable resin 10a' has already proceeded to the intermediate stage before the step S7 is performed. Accordingly, the bonding strength is different between the first adhesive portion 10a and the second adhesive portion 10b in the adhesive 10, and the bonding strength of the second adhesive portion 10b is lower than that of the first adhesive portion 10a in the same manner as in the procedures described for Example 1.

Further, the viscosity is higher and the fluidity is lower in the ultraviolet curable resin in which the curing reaction proceeds to the intermediate stage than in the uncured ultraviolet curable resin. Accordingly, when the panel-like member 3 and the liquid crystal display panel 1 are bonded closely, the first ultraviolet curable resin 10a' whose curing reaction proceeds to the intermediate stage functions as a wall and the second ultraviolet curable resin 10b' can be prevented from flowing out.

As has been described above, in the method of manufacturing the liquid crystal display device of Example 2 (method of bonding the panel-like member 3 to the liquid crystal display panel 1), high reliability of the bonding strength and high repairability are compatible when the panel-like member 3 is bonded to the liquid crystal display panel 1.

Further, in the method of manufacturing the liquid crystal display device of Example 2, when the panel-like member 3 is bonded to the liquid crystal display panel 1, an adhesive interposed therebetween (uncured ultraviolet curable resin) can be prevented from flowing out.

Naturally, in the method of manufacturing the liquid crystal display device of Example 2, the first ultraviolet curable resin 10a' and the second ultraviolet curable resin 10b' coated on the surface of the panel-like member 3 or the liquid crystal display panel 1 may be formed of a resin material of an identical composition or may be formed of resin materials of different compositions. When the resin material of the identical composition is used, a radical reaction type material may be used, for example. Further, when the resin materials of the different compositions is used, a cationic polymerization type material may be used as the first ultraviolet curable resin 10a' while a radical reaction type material may be used as the second ultraviolet curable resin 10b'.

Figure 16:
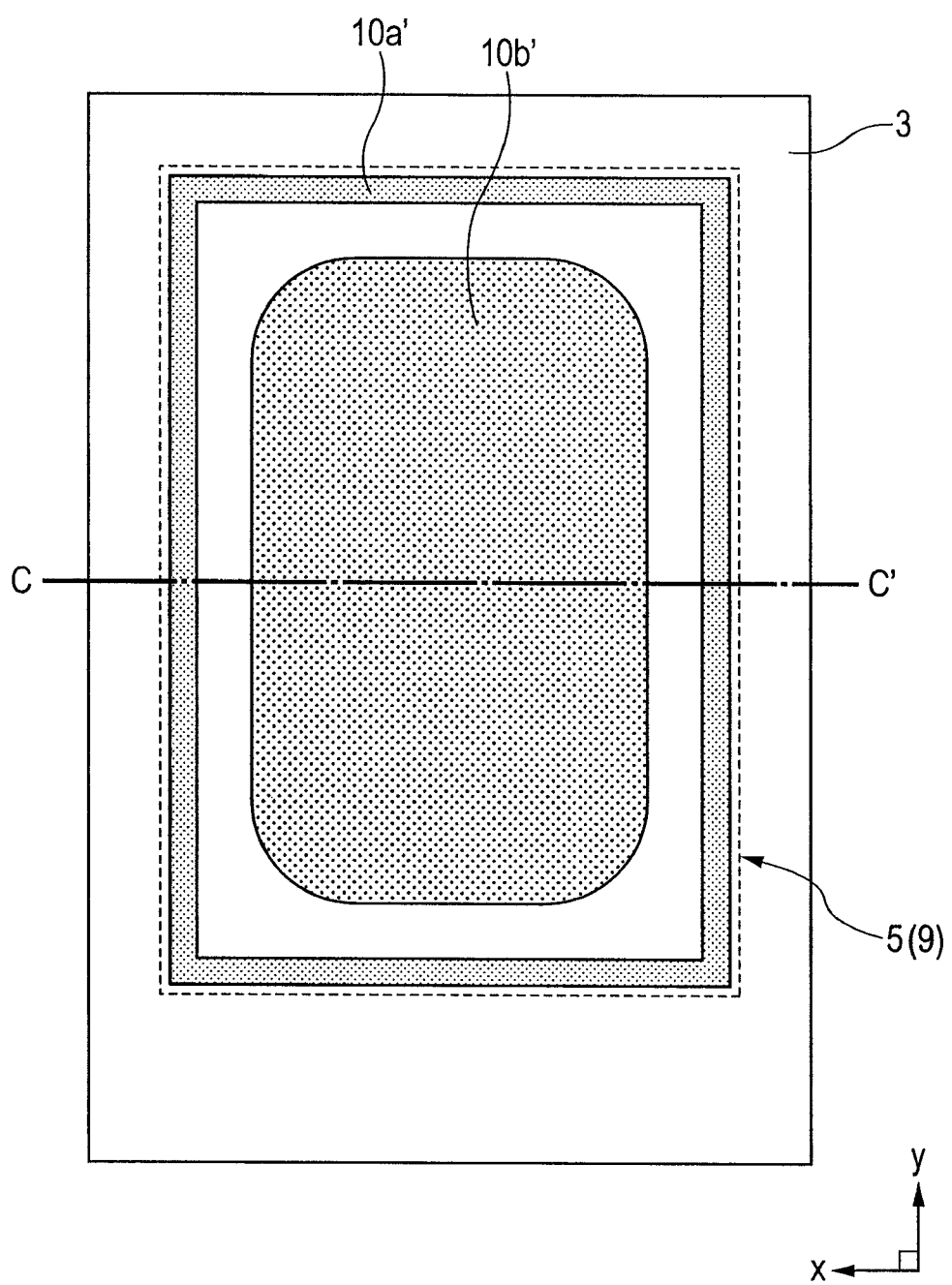
FIG. 16 is a schematic plan view showing an example of a coating method of a second ultraviolet curable resin.
Figure 17:
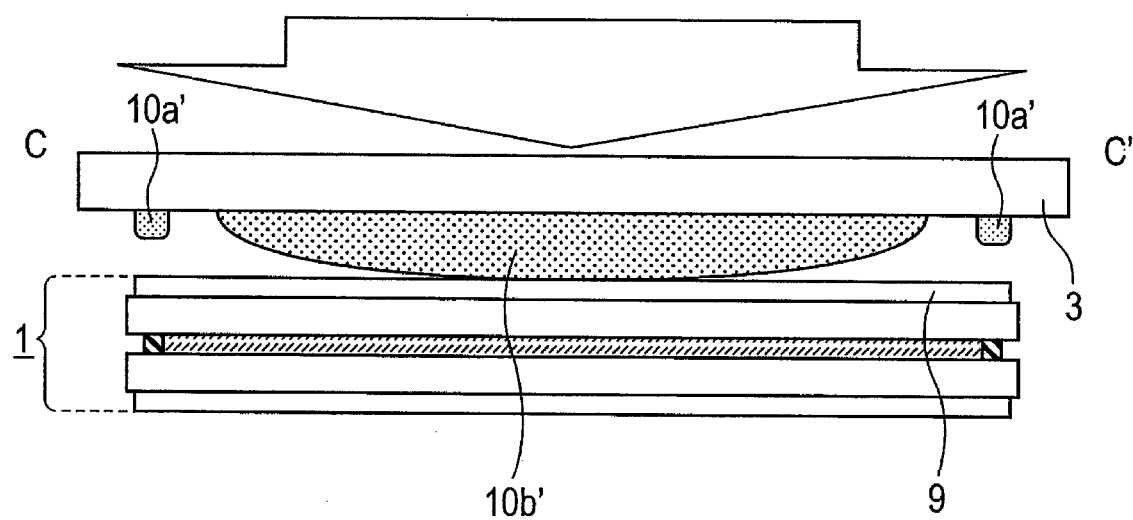
FIG. 17 is a schematic cross sectional view showing an example of a cross sectional configuration along line C-C' in FIG. 16.

FIGS. 16 and 17 are schematic views of assistance for explaining a modification of the method of manufacturing the liquid crystal display device of Example 2.

FIG. 16 is a schematic plan view showing an example of a coating method of a second ultraviolet curable resin. FIG. 17 is a schematic cross sectional view showing an example of a cross sectional configuration along line C-C' in FIG. 16.

As an example of a method of coating a second ultraviolet curable resin 10b' to a region surrounded by the first ultraviolet curable resin 10a', Example 2 discloses, a method of coating the resin in a dot matrix shape as shown in FIGS. 12 and 13. Naturally, when the second ultraviolet curable resin 10b' is coated on a region surrounded by the first ultraviolet ray curable region 10a', a second ultraviolet curable resin 10b' may be coated (integrally) on the central portion of a region surrounded by the first ultraviolet curable resin 10a', for example, as shown in FIGS. 16 and 17. Further, it is needless to say that when the second ultraviolet curable resin 10b' is coated on a plurality of portions in the region surrounded by the first ultraviolet ray curable resin 10a', the amount by which the second ultraviolet curable resin 10b' is coated and the method of disposing the same may changed properly.

Figure 18:
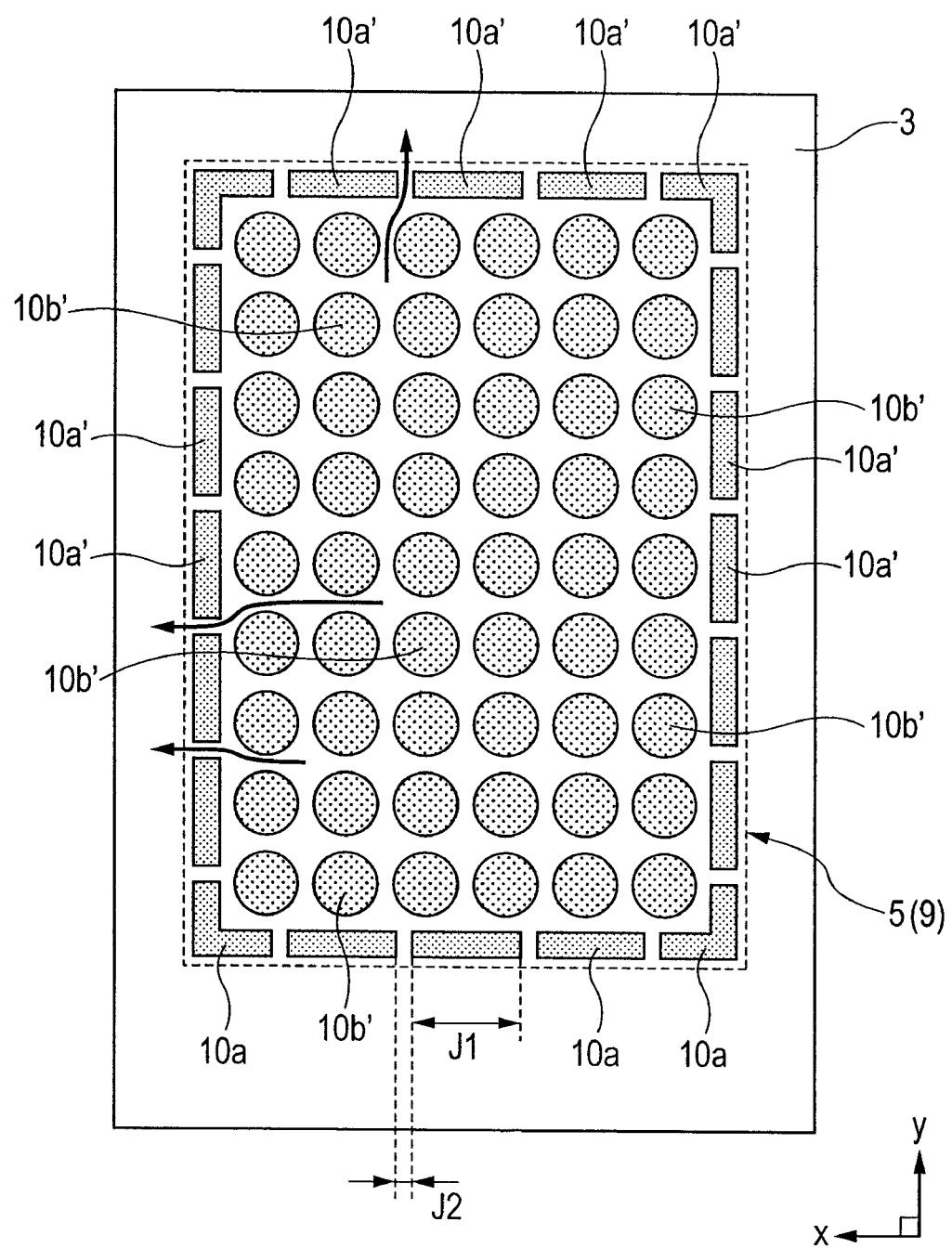
FIG. 18 is a schematic plan view showing an application example of a coating method of a first ultraviolet curable resin.

FIG. 18 is a schematic plan view showing an application example of a coating method of the first ultraviolet curable resin.

In Example 2, the first ultraviolet curable resin 10a' is first coated in the circular shape on the surface of the panel-like member 3 or the liquid crystal display panel 1 and, successively, the second ultraviolet curable resin 10b' is coated on a region surrounded by the first ultraviolet curable resin 10a'. With such procedures, when the panel-like member 3 and the liquid crystal display panel 1 are bonded closely, the first ultraviolet curable resin 10a' functions as a wall and the second ultraviolet curable resin 10b' can be prevented from flowing out as described above.

However, in this case, since the first ultraviolet curable resin 10a' functions as a wall, for example, also to air present in the region surrounded by the first ultraviolet curable resin 10a'. For this reason, when the panel-like member 3 and the liquid crystal display panel 1 are bonded closely, foams may tend to be formed, for example, at the boundary between the first ultraviolet curable resin 10a' and the second ultraviolet curable resin 101D'.

Accordingly, when the first ultraviolet curable resin 10a' is coated in the circular shape on the surface of the panel member 3 or the liquid crystal display panel 1, it is considered that the first ultraviolet curable resin 10a' is coated preferably in such a manner as to form an intermittent circular shape. In this case, a length of each part of the first ultraviolet curable resin 10a' in the circumferential direction thereof is assumed as J1 and a length of each recess of the first ultraviolet curable resin 10a' in the circumferential direction thereof is assumed as J2. The relation between the length J1 and the length J2 can be changed properly. It should be noted that an intact closed circular shape needs to be provided when the panel-like member 3 and the liquid crystal display panel 1 are bonded closely.

In the configuration described above, when the panel-like member 3 is bonded to the liquid crystal display panel 1 and the second ultraviolet curable resin 10b' coated in the dot matrix shape is integrated, air present in the region surrounded by the first ultraviolet curable resin 10a' flows out through the intermittent recessed portions as shown by a broken line. Accordingly, when the panel-like member 3 and the liquid crystal display panel are bonded closely, it is possible to prevent foams from being generated, for example, at the boundary between the first ultraviolet curable resin 10a' and the second ultraviolet curable resin 10b'.

While the invention has been described specifically with reference to the examples, the invention is not restricted to the examples but can be modified variously. It will be apparent that various modifications are possible within a range not departing from the spirit of the invention.

For example, the present specification describes a liquid crystal display device having a backlight as an example of the display device to which the invention is applied. However, it is apparent that the invention is not limited thereto and applicable also to a liquid crystal display device not having the backlight 2, that is, a reflection type liquid crystal display device that controls the reflectance of external light for each pixel to display videos and images.

Further, the panel-like member 3 is not limited to the protective cover for protecting the liquid crystal display panel 1 but may also be a device such as a touch panel.

Further, while the present specification describes a liquid crystal display device as an example of the display device to which the invention is applied, the invention is not limited thereto and is applicable also to the case of bonding of a panel-like member 3 to a thin self-emission type display panel using an emission member such as an organic EL material.

What is claimed is:
1. A display device comprising:
a display panel; and
a panel-like member bonded to the display panel with an adhesive made of an ultraviolet curable resin;
wherein the adhesive includes a first adhesive portion and a second adhesive portion, the first adhesive portion being provided outside of a display area of the display panel and formed in a circular shape to surround the display area, the second adhesive portion prevailing in an area surrounded by the first adhesive portion, the first adhesive portion being different in a modulus of elasticity from the second adhesive portion, and wherein the modulus of elasticity of the second adhesive portion is smaller than the modulus of elasticity of the first adhesive portion.

2. The display device according to claim 1, wherein the first adhesive portion and the second adhesive portion are formed by curing an identical ultraviolet curable resin under different conditions and the crosslinking density of the second adhesive portion is lower than that of the first adhesive portion.

3. The display device according to claim 1, wherein the first adhesive portion and the second adhesive portion comprise ultraviolet curable resins of different compositions.

4. A method of manufacturing a display device, the method including a step of bonding a panel-like member to a display panel by using an adhesive, in which
  the step includes a first step of coating an ultraviolet curable resin to the surface of the panel-like member or the display panel,
  a second step of closely bonding the panel-like member and the display panel by an uncured ultraviolet curable resin, and
  a third step of irradiating the ultraviolet curable resin with a predetermined amount of ultraviolet rays,
  wherein the third step has a step of irradiating with ultraviolet rays the entire ultraviolet curable resin and a step of irradiating with ultraviolet rays only a circular region extending along the outer periphery of the ultraviolet curable resin, and
  wherein the amount of ultraviolet rays irradiated in each of the steps is such an amount of light that the curing reaction for the ultraviolet curable resin proceeds to an intermediate stage and the circular region is completely cured.

5. A method of manufacturing a display device, the method including a step of bonding a panel-like member to a liquid crystal display panel by using an adhesive, the step comprising:
  a first step of coating a first ultraviolet curable resin in a circular shape to the surface of the panel-like member or the display panel,
  a second step of coating a second ultraviolet curable resin to the surface of the panel-like member or the display panel in a region surrounded by the first ultraviolet curable resin or a region overlapping with the region, and
  a third step of closely bonding the panel-like member and the display panel by the first ultraviolet curable resin and the second ultraviolet curable resin, and
  a fourth step of irradiating with a predetermined amount of ultraviolet rays the first ultraviolet curable resin and the second ultraviolet curable resin, thereby curing the same,
  wherein a modulus of elasticity of the second ultraviolet curable resin after the fourth step is smaller than a modulus of elasticity of the first ultraviolet curable resin.

6. The method of manufacturing a display device according to claim 5, wherein
  the first step is set such that, after the coating of the first ultraviolet curable resin, a the first ultraviolet curable resin is irradiated with a predetermined amount of ultraviolet rays and its curing reaction proceeds to an intermediate stage.

7. The method of manufacturing a display device according to claim 5, wherein
  the first ultraviolet curable resin coated in the first step is made of a resin material having a higher viscosity than the second ultraviolet curable resin coated in the second step.

8. The method of manufacturing a display device according to claim 5, wherein
  the first ultraviolet curable resin is formed in an intermittent circular shape when coated in the first step and formed in a closed circular shape in the third step.

* * * * *